US005084344A

United States Patent [19]

Harada et al.

[11] Patent Number: 5,084,344

[45] Date of Patent: Jan. 28, 1992

[54] PHOTOGRAPHIC SUPPORT COMPRISING A LAYER CONTAINING AN ELECTRON BEAM HARDENED RESIN AND WHITE PIGMENT OF A THICKNESS OF 5-100 MICRONS

[75] Inventors: Junji Harada; Seigo Ebato; Takahisa Kato, all of Tokyo, Japan

[73] Assignee: Mitsubishi Paper Mills Limited, Tokyo, Japan

[21] Appl. No.: 313,866

[22] Filed: Feb. 23, 1989

[30] Foreign Application Priority Data

| | | | |
|---|---|---|---|
| Feb. 26, 1988 | [JP] | Japan | 63-44987 |
| Apr. 6, 1988 | [JP] | Japan | 63-86208 |
| Jun. 1, 1988 | [JP] | Japan | 63-136017 |
| Dec. 14, 1988 | [JP] | Japan | 63-317519 |

[51] Int. Cl.[5] .......... B32B 29/00

[52] U.S. Cl. .......... 428/334; 430/538; 430/531; 428/508; 428/516; 428/537.7; 428/926; 428/422; 428/409; 428/405

[58] Field of Search .......... 430/538, 531; 522/4; 428/334

[56] References Cited

U.S. PATENT DOCUMENTS

| | | | |
|---|---|---|---|
| 4,070,497 | 1/1978 | Wismer et al. | 522/4 |
| 4,311,732 | 1/1982 | Kaetsu et al. | 427/164 |
| 4,326,001 | 4/1982 | Sachs et al. | 522/4 |
| 4,364,971 | 12/1982 | Sack et al. | 427/44 |
| 4,384,040 | 5/1983 | Von Meer | 430/532 |
| 4,426,431 | 1/1984 | Harasta et al. | 430/14 |
| 4,508,751 | 4/1985 | Tamagawa et al. | 427/44 |
| 4,558,002 | 12/1985 | Aotsuka et al. | 430/538 |
| 4,590,147 | 5/1986 | Lindley | 430/286 |
| 4,645,736 | 2/1987 | Anthonsen et al. | 430/538 |
| 4,729,945 | 3/1988 | Anthonsen et al. | 430/538 |

*Primary Examiner*—P. C. Sluby
*Assistant Examiner*—Stevan A. Resan
*Attorney, Agent, or Firm*—Cushman, Darby & Cushman

[57] ABSTRACT

A photographic support having a layer of a white pigment and an electron beam hardenable resin on a support can be improved in adhesive strength, surface appearance and other properties by forming an outermost layer containing an ultraviolet curable resin, or impregnating an electron beam hardenable resin into the support, or inserting an electron beam hardenable leveling agent into the white pigment-resin layer, or forming an outermost layer containing a fluorescent agent and an electron beam hardenable resin.

14 Claims, 1 Drawing Sheet

PHOTOGRAPHIC SUPPORT COMPRISING A LAYER CONTAINING AN ELECTRON BEAM HARDENED RESIN AND WHITE PIGMENT OF A THICKNESS OF 5-100 MICRONS

BACKGROUND OF THE INVENTION

This invention relates to a photographic support and a process for producing the same. More particularly, this invention relates to a water-resistant photographic support having a layer containing an electron radiation hardened resin and white pigment and a process for producing the same.

Recently, there are mainly used photographic supports obtained by coating at least one surface of a base sheet used as a support with a polyolefin resin kneaded with a white pigment. Such a polyolefin resin layer is formed on the base sheet for mainly preventing the base sheet from penetration of treating chemicals thereinto at the time of developing. Further, by forming the polyolefin resin layer, the developing time can be shortened and yellowing, with the lapse of time, can be prevented because of no residual treating chemicals in the base sheet. The polyolefin resin layer is usually formed by using a melt extruder. Further, in the polyolefin resin layer which becomes a front side of a photographic paper, an inorganic white pigment such as titanium dioxide is kneaded in order to improve hiding power and whiteness of the photographic support and to improve resolving power of photographic paper. However, since the polyolefin resin is remarkably highly viscous even when melted by heat, it is not easy to disperse the inorganic pigment such as titanium dioxide and further, the content of the inorganic pigments is limited. In order to obtain good hiding power and whiteness, the thickness of the polyolefin resin layer should be increased. Further, since the melt extrusion coating of the polyolefin resin is carried out at the pyrolysis temperature of the polyolefin resin or higher, yellowing due to pyrolysis of the resin and pin holes are produced in the resin layer. Further, with an increase of the extrusion speed, since the molten polyolefin resin is peeled off before sufficiently cooled and solidified by a cooling roll, releasing properties of the coating resin from the cooling roll becomes poor to produce so-called "blocking" and optical unevenness of gloss surface usually called "transverse stripe unevenness". Therefore, there is a problem in that quality of a printing paper which is a final product is undesirably lowered. In order to prevent the generation of unevenness due to "blocking", it is generally known to add a lubricant to the polyolefin resin. But, according to this method, an amount of smoke from the molten polyolefin resin surface due to pyrolysis of the lubricant increases at the time of melt extrusion, which results in causing stain on the cooling roll surface. As a result, quality of the resin coated surface is lowered to bring about secondary lowering in quality such as causing a so-called "satin surface".

In the production of a resin-coated photographic support by the melt extrusion method, it is difficult to thin the resin coating layer while maintaining a proper hiding power or to increase the coating speed without lowering the quality. Thus, there is proposed a water-resistant photographic support obtained by coating an electron radiation hardened resin kneaded with a white pigment on a base sheet, followed by irradiation with election beams to form a coating layer (e.g. U.S. Pat. No. 4,384,040). The resulting photographic support can have a thin resin layer without lowering the covering power. Further, since the hardened resin layer is obtained by polymerization and crosslinking with irradiation of election beams at room temperature, the defects caused by the melt extrusion method can be removed.

But there arises another fatal problem in that when a photographic paper is made from said photographic support, yellowing progresses with the lapse of time due to influences of electron beam irradiation such as decomposition of cellulose in the base sheet and adsorption of treating chemicals on the coating resin during the developing step. Further, there is another problem in the production process in that the irradiation of election beams should be carried out in an inert gas in order to prevent poor hardening caused by oxygen. But even if the election radiation hardening is carried out in an inert gas, the resulting hardened resin layer is insufficient in adhesive strength with a photographic emulsion layer to be formed, and thus should be subjected to a surface activating treatment such as a corona treatment, a flame treatment, etc. Further, even if such a surface activating treatment is conducted, sufficient adhesive strength cannot be obtained due to unevenness of surface activity.

A further disadvantage of this photographic support is that when a photographic paper obtained from this photographic support is subjected to development, adhesive strength is undesirably lowered to cause peeling in the worst case.

A still further disadvantage of this photographic support is that the control of coating step using a coater is difficult, since the viscosity of an electron radiation hardened resin is remarkably increased by dispersion of a white pigment when dispersed in high concentration, and rib-like unevenness is caused after coating.

A still another disadvantage of this photographic support is that when a white pigment is dispersed in high content in an electron radiation hardened resin, not only are the effects of the fluorescent agent remarkably decreased due to the covering of the almost fluorescent agent with the white pigment, but also fogging of photographic emulsion layer is produced by decomposed product of the fluorescent agent in the case of forming a photosensitive emulsion layer on the hardened resin layer caused by electron radiation depending upon the kind of fluorescent agent used. Further, some fluorescent agents may remarkably lower coating properties of an electron radiation hardened composition containing a white pigment fail to obtain a smooth surface, even if contained in a trace amount. In addition some fluorescent agents may lower hardening properties of an electron radiation hardened composition such that an excess amount of electron beams irradiation is required.

SUMMARY OF THE INVENTION

Objects of the present invention are to provide photographic supports containing one or more layers including a white pigment and an electron radiation hardened resin overcoming the disadvantages mentioned above.

The present invention provides a photographic support comprising a support, a hardened layer of a composition comprising a white pigment and an electron beam hardened resin (EB resin-pigment layer) formed on one surface of the support, and a hardened layer of a composition comprising an ultraviolet hardened resin and a photopolymerization initiator formed on the EB resin-pigment layer, and a process for producing the same.

The present invention also provides a photographic support comprising a support obtained by impregnating an electron beam hardened resin thereinto, followed by hardening with irradiation of electron beams, and an opaque resin coating layer containing a white pigment, formed on one surface of the support, and a process for producing the same.

The present invention further provides a photographic support comprising a support, and a hardened layer of a composition comprising a white pigment, an electron beam hardened resin, and an electron beam hardenable leveling agent, formed on one surface of the support, and a process for producing the same.

The present invention still further provides a photographic support comprising a support, a hardened layer of a composition comprising a white pigment and an electron beam hardened resin (EB resin-pigment layer) formed on one surface of the support, and a hardened layer of a composition comprising an electron beam hardened resin and a fluorescent agent, formed on the EB resin-pigment layer, and a process for producing the same.

DESCRIPTION OF THE PREFERRED EMBODIMENTS

Figure 1:
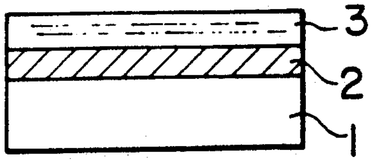
FIG. 1 to 6 are cross-sectional views of photographic supports of the present invention.

The photographic supports of the present invention include an electron beam hardened resin (hereinafter referred to as "EB resin") and a white pigment in the same layer or in different layers. The supports overcome the disadvantages of the photographic supports of the prior art.

As the EB resin, there can be used unsaturated polyesters, modified unsaturated polyesters and acrylic polymers, these having one or more electron radiation reactive groups at terminals and/or side chains of molecules, and monomers having unsaturated bonds. These materials can be used alone or together with a solvent. These materials can be selected based on the affinity between a base sheet for photographic paper and an electron beam hardenable composition and an affinity between a base sheet for photographic paper and photosensitive materials, treating chemicals such as a developing solution, and the like.

Examples of the EB resin are as follows.

(a) Polyester acrylates, polyester methacrylates

ARROWNIX M-5300, M-5400, M-5500, M-5600, M-5700, M-6100, M-6200, M-6300, M-6500, M-7100, M-8030, M-8060, M-8100 (trade names, mfd. by Toagosei Chemical Industry Co., Ltd.); BISCOAT 700, 3700 (trade names, mfd. by Osaka Organic Chemical Ind. Co., Ltd.); KAYARAD HX-220, HX-620 (trade names, mfd. by Nippon Kayaku Co., Ltd.).

(b) Urethane acrylates, urethane methacrylates

ARROWNIX M-1100, M-1200, M-1210, M-1250, M-1260, M-1300, M-1310 (trade names, mfd. by Toagosei Chemical Industry Co., Ltd.); BISCOAT 812, 823, (trade names, mfd. by Osaka Organic Chemical Ind. Co., Ltd.); NK ester U-108-A, NK ester U-4HA (trade names, mfd. by Shinnakamura Chemical Co., Ltd.).

(c) Monofunctional acrylates, monofunctional methacrylates

Methyl acrylate, ethyl acrylate, butyl acrylate, 2-ethylhexyl acrylate, 2-hydroxyethyl acrylate, 2-hydroxyethyl methacrylate, 2-hydroxypropyl acrylate, tetrahydrofurfuryl acrylate, phenoxyethyl acrylate, cyclohexyl acrylate, cyclohexyl methacrylate, benzyl acrylate, glycidyl methacrylate, N,N-dimethylaminoethyl acrylate, N,N-dimethylaminoethyl methacrylate, N,N-diethylaminoethyl methacrylate, butoxyethyl acrylate, etc.

Ethylene oxide-modified phenoxylated phosphoric acrylate, ethylene oxide-modified butoxylated phosphoric acrylate, acryloylmorpholine, ARROWNIX M-101, M-102, M-111, M-113, M-114, M-117, M-152, M-154 (trade names, mfd. by Toagosei Chemical Industry Co., Ltd.).

(d) Polyfunctional acrylates, polyfunctional methacrylates 1,6-Hexamediol diacrylate, 1,6-hexanediol dimethacrylate, neopentyl glycol diacrylate, diethylene glycol diacrylate, polyethylene glycol diacrylate, polyethylene glycol dimethacrylate, polypropylene glycol diacrylate, polypropylene glycol dimethacrylate, pentaerythritol diacrylate, trimethylolpropane hexaacrylate, isocyanuric diacrylate, pentaerythritol triacrylate, isocyanuric triacrylate, trimethylolpropane triacrylate, trimethylolpropane trimethacrylate, ethylene oxide-modified pentaerythritol tetraacrylate, propylene oxide-modified pentaerythritol tetraacrylate, propylene oxide-modified trimethylolpropane polyacrylate, ethylene oxide-modified trimethylolpropane polyacrylate, etc.

ARROWNIX M-210, M-215, M-220 M-230, M-233, M-240, M-245, M-305, M-309, M-310, M-315, M-320, M-325, M-330, M-400, M-450, TO-458, TO-747, TO-755, THIC, TA2 (trade names, mfd. by Toagosei Chemical Industry Co., Ltd.).

(e) Epoxy acrylates, epoxy methacrylates

NK ester EA-800, NK ester EPM-800 (trade names, mfd. by Shinnakamura Chemical Co., Ltd.), BISCOAT 600, 540 (trade names, mfd. by Osaka Organic Chemical Ind. Co., Ltd.); Photomer 3016, 3082 (trade names, mfd. by San Nopco Co., Ltd.)

(f) Epoxy compounds

Glycidyl methacrylate, 1,3-bis-(N,N-diepoxypropylaninomethyl) cyclohexane, 1,3-bis(N,N-diepoxypropylaminomethyl) benzene, etc.

GE-510, TETRAD-X, TETRAD-C (trade names, mfd. by Mitsubishi Gas-Chemicals Co., Inc.)

The EB resin can be used together with various additives such as pigments and dyes, e.g. ultramarine blue, cobalt violet, etc., antioxidants, fluorescent brighteners, antistatic agents, dispersing agents, stabilizing agents, etc. conventionally used in a surface polyethylene layer formed on a photographic support by melt extrusion method.

Since hardening of the EB resin is carried out by irradiating electron beams, the use of a photopolymerization initiator is not necessary in principle. But, in order to reduce unreacted resin, it is possible to use a photopolymerization initiator.

As the photopolymerization initiator, there can be used acetophenones such as di- or trichloroacetophenone, benzophenone, Michler's ketone, benzil, benzoin, benzoin alkyl ethers, benzyl dimethyl ketal, tetramethylthiuram monosulfide, thioxanthones, azo compounds, various silver salts, etc.

Such a photopolymerization initiator is used in an amount of preferably 0.1 to 10% by weight based on the weight of the EB resin.

The photopolymerization initiator can be used together with a storage stabilizer such as hydroquinone.

As the white pigment, there can be used rutile-type or anatase-type titanium dioxide, zinc oxide, talc, calcium carbonate, barium carbonate, barium sulfate, calcium sulfate, silica, etc. These pigments can be used in a non-treated state or after treated with a siloxane, alumina, an alcohol, or the like.

As the base sheet used as a support, there can be used natural pulp paper, synthetic fibers, so-called synthetic paper obtained by making a synthetic resin film paper-like, resin coated paper obtained by forming a water-resistant resin coating layer on at least one side of the base sheet, or a synthetic resin sheet. Among them, the use of natural pulp paper having as a main component a wood pulp, e.g. softwood pulp, hardwood pulp, a mixture of softwood pulp and hardwood pulp, is preferable.

The base sheet has no particular limitation in thickness, but preferably has smooth surfaces and a basis weight of 50 to 250 g/m$^2$.

A base sheet containing a natural pulp as a main component, said base sheet being effectively used in the present invention, may contain various polymers and additives. Examples of these materials are dry paper strength agents such as starch derivatives, polyacrylamides, polyvinyl alcohol derivatives, gelatin, etc.; sizing agents such as fatty acid salts, rosin derivatives, dialkyl ketene dimer emulsified material, etc.; wet paper strength agents such as melamine resins, urea resins, epoxidized polyamides, etc.; stabilizing agents, pigments, dyes, antioxidants, fluorescent brighteners, various kinds of latexes, inorganic electrolytes, pH adjusting agents, and the like, alone or in combination thereof.

The photographic support of the present invention can take various structures.

[STRUCTURE A]

In order to prevent yellowing with the lapse of time due to treating chemicals used in the development of photographic paper obtained from photographic supports and to remove undesirable influences of oxygen at the time of hardening of the EB resin using electron beams, the photographic support having a structure as shown in FIG. 1 is preferable.

That is, the photographic support comprises a support 1, a hardened layer 2 of a composition comprising a white pigment and an EB resin formed on the support (hereinafter referred to as "EB resin-pigment layer"), and a hardened layer 3 of a composition comprising a ultraviolet (UV) hardened resin and a photopolymerization initiator (hereinafter referred to as "UV resin layer") formed on the EB resin-pigment layer.

The photographic support having the structure as shown in FIG. 1 has not only merit in that it is not necessary to remove oxygen at the production thereof, but also an important property, that is, a good adhesiveness to a photographic emulsion to be formed on the UV resin layer compared with the prior art photographic support.

On the rear side of the support, opposite to the EB resin-pigment layer and the UV resin layer, there can be formed as a water-resistant resin layer a polyolefin resin coating layer obtained by a melt extrusion method, or a layer of EB resin hardened by irradiating electron beams.

As the UV hardened resin (hereinafter referred to as "UV resin"), there can be used the same materials as recited as the EB resin.

The same or different resins may be used as the EB resin and the UV resin.

The UV resin layer 3 shown in FIG. 1 is preferably a transparent resin layer considering transmittance of UV rays. But, it is possible to include a white pigment in the UV resin layer considering the thickness of the UV resin layer and the content of the white pigment.

The photographic support of FIG. 1 can be produced by coating a composition comprising a white pigment and an EB resin on a support 1, coating a composition comprising a UV resin and a photopolymerization initiator on the EB resin layer, irradiating the UV resin layer with UV rays for hardening the UV resin, and irradiating electron beams for hardening the EB resin-pigment layer and the whole coating layers.

The content of the white pigment in the EB-pigment resin layer is preferably in the range of 20 to 80% by weight, more preferably 20 to 70% by weight. When the content is too small, the hiding power becomes insufficient. On the other hand, when the content is too large, the ability of the EB resin as a binder is reduced and the electron beam irradiation dose increases, which results in giving undesirable influences on the base sheet used as the support and the coated resins.

As the photopolymerization initiators used in the UV resin layer, there can be used ethylanthraquinone, methylbenzyl formate, 1-hydroxycyclohexyl phenyl ketone, acetophenones such as acetophenone, diethoxyacetophenone, di- or trichloroacetophenone; 0-benoylmethyl benzoate, benzophenone, Michler's ketone, benzil, benzoin, benzoin alkyl ethers, benzyldimethyl ketal, tetramethylthiuram monosulfide, xanthone, thioxanthones, azo compounds, etc.

The photopolymerization initiator can be used preferably in the range of 0.1 to 10% by weight based on the weight of the UV resin. It is possible to use a preservant such as hydroquinone together with the photopolymerization initiator.

In order to improve adhesiveness between the base sheet and the EB resin-containing composition and wetting properties of the base sheet, the base sheet can be subjected to a surface treatment such as a corona discharge treatment on the surface. Further, in order to improve adhesiveness between the UV resin layer after electron beams irradiation and a photosensitive emulsion, or to control wetting properties of the UV resin layer, it is possible to subject the UV resin layer after electron beam irradiation to a surface treatment such as a corona discharge treatment.

The white pigment and the EB resin can be mixed by using a conventional kneader for pigments. Examples of such kneaders are a twin roll, a three-roll mill, a ball mill, a kneader, a high speed mixer, a homogenizer, etc.

The resulting EB resin-containing composition can be coated on the base sheet using a conventional method such as blade coating, air doctor coating, air knife coating, spray coating, squeeze coating, reverse roll coating, gravure roll coating, transfer roll coating, curtain coating, extrusion bar coating, etc.

Thickness of the EB resin-pigment layer changes depending on the kind of base sheet used, but is preferably 5 to 100 μm, more preferably 5 to 50 μm. When the thickness is too thin, the EB resin-pigment layer is readily influenced by unevenness of the base sheet and readily generates pin holes. On the other hand, when the thickness is too large, it is difficult to coat uniformly and to harden uniformly, which results in giving undesirable influences on quality.

The UV resin layer can be formed on the EB resin-pigment layer in the same manner as described in the forming of the EB resin-pigment layer.

The thickness of the UV resin layer changes depending on the kind of EB resin layer and the content of white pigment in the UV resin layer, and is preferably 0.1 to 10 μm, more preferably 0.5 to 5 μm. In order to interrupt the contact of the EB resin-pigment layer with oxygen in the outer air, the above-mentioned range of thickness is sufficient for such a purpose. When the thickness is too thin, uniform coating of the UV resin layer on the EB resin-pigment layer becomes difficult and pin holes are easily formed in the UV resin layer, which results in readily making the surface of UV resin layer non-uniform even after irradiating with electron beams. On the other hand, a layer to be hardened by UV rays is required to be transparent to some extent. When the thickness is too thick, difference in light passages is caused by the thickness of the UV resin layer at the time of exposing to light to cause lowering in resolving power. This is not desirable from the viewpoint of quality.

In order to obtain a glossy surface on the resin coated side surface, a surface to be treated is in contact with a mirror finish roll and electron beams are irradiated from the back side for hardening to give the mirror finish.

When the EB resin-containing composition layer is in contact with the roll, it is generally said that it is not necessary to purge the oxygen in an electron beam irradiation apparatus. But it is more preferable to harden the surface layer, that is, the UV resin-containing layer, previously.

In the process of the present invention, it is possible to partly harden the surface of the UV resin layer by irradiating UV rays, to contact with a mirror finish roll, to peel the mirror finish roll, followed by complete curing by a secondary irradiation to give a mirror finish.

If embossing is required on the UV resin layer, it is possible to use an embossing roll in place of the mirror finish roll for providing a surface having desired embossing or a finely roughened surface.

Irradiation of electron beams is conducted considering transmitting power and hardening ability and is preferably 100 to 1000 KV in terms of accelerating voltage. It is more preferable to use an electron beam accelerator of 100 to 300 KV and to control the one pass absorption dose in the range of 0.5 to 20 Mrad. When the accelerating voltage or the electron irradiation dose (one pass absorption dose) is too low, the transmitting power of the electron beams becomes too low to conduct sufficient hardening of the resin. On the other hand, when the accelerating voltage or the electron irradiation dose is too high, energy efficiency becomes worse and undesirable influences effect on quality such as lowering in strength of base sheet, decomposition of the resins, etc.

As the electron beam accelerator, there can be used any types such as electron curtain system, scanning type, double scanning type, etc.

As the UV irradiating apparatus, there can be used a low-pressure mercury lamp, a middle-pressure mercury lamp, a high-pressure mercury lamp, a metal halide lamp, an ozoneless type apparatus which generates ozone in a very small amount, etc. Usually, a plurality of lamps having an output of 30 W/cm or more are used in parallel.

According to prior art processes, since a high concentration of oxygen damages hardening of an electron beam hardened composition with irradiation of electron beams, the irradiation is usually carried out at an oxygen concentration of 600 ppm or less, preferably 400 ppm or less, by replacing the air by nitrogen, helium, carbon dioxide, or the like inert gas. But in the present invention, the oxygen is not required to be replaced by an inert gas, in principle. But in order to prevent overheating and to exhaust ozone generated in the electron beam irradiating apparatus, it is preferable to circulate an inert cooling gas between an electron beam irradiation portion of the apparatus and a cooling gas generator.

The resulting photographic support is then subjected to coating of a photosensitive emulsion on the UV resin layer for producing photographic paper in a conventional manner.

In the production of the photographic support of the structure A, since a hardened or partly hardened UV resin layer obtained by UV irradiation covers the surface of the non-hardened EB resin-pigment layer, poor hardening of the EB resin-pigment layer due to oxygen does not take place. Thus, the control of oxygen concentration in the apparatus at the time of electron beam irradiation is not necessary. The resulting photographic support is excellent in adhesiveness between the UV resin layer of the photographic support and the photographic emulsion layer. This seems to be derived from the formation of functional groups good in affinity, with the photographic emulsion layer on the outmost surface layer by the irradiation of UV rays or electron beams in an oxygen-containing atmosphere. Further, since the photographic support having the structure A can disperse pigments in high concentration, it is possible to produce photographic supports excellent in water resistance, hiding power and whiteness.

[STRUCTURE B]

Figure 2:
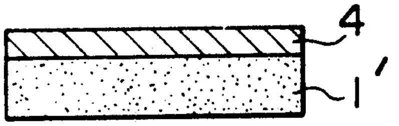

In order to improve adhesiveness between a support and an opaque resin coating layer together with a photographic emulsion layer and to control yellowing of the support due to electron beam irradiation, the photographic support having a structure as shown in FIGS. 2 is preferable.

That is, the photographic support comprises a support 1' obtained by impregnating an electron beam hardened resin (EB resin) thereinto, followed by hardening with irradiation of electron beams, and an opaque resin coating layer 4 containing a white pigment, formed on one surface of the support.

As the resin used in the opaque resin coating layer, there can be used the electron beam hardened resin mentioned above or a polyolefin resin.

As the polyolefin resin, there can be used homopolymers such as low-density polyethylene, high-density polyethylene, a mixture of low-density polyethylene and high-density polyethylene, polypropylene, polybutene, polypentene, etc.; copolymers such as ethylene-propylene copolymer, etc.; blends of these homopolymers and copolymers. Among them, the use of polyethylenes is preferable.

When a molten polyolefin resin is used in the opaque resin coating layer and placed on a base paper (i.e. a support) impregnated with an electron beam hardened resin (EB resin), followed by hardening by means of irradiation with electron beams, the resulting photographic support is remarkably good in adhesive strength between the polyolefin resin layer and the base sheet.

The impregnation of the base sheet with the EB resin can be carried out by either a method wherein the EB resin is dispersed in a so-called white water from the step of paper making and adsorbed in cellulose fibers, or a method wherein the EB resin is adsorbed on cellulose fibers by dipping a base sheet in a tub containing the EB resin after paper making. In this case, in order to make the impregnation of EB resin better, the EB resin can be used alone, or in a state dissolved in a solvent such as acetone, toluene, ethyl acetate, etc. or in the state of emulsion. Since lowering in adhesive strength between the base sheet and an overlying layer is particularly limited to the electron beam irradiated side, it is effective to adsorb and impregnate the EB resin concentratedly into one side of the base sheet using a tub.

In the structure B, the EB resin can be selected considering electron beam hardening properties, dispersibility of high concentration white pigment, weather resistance, film strength, heat resistance, curling properties, adhesiveness with the support, and the like. Among the EB resins mentioned above, tri or higher polyfunctional acrylate resins are more preferable.

The EB resin or polyolefin resin with white pigment can be coated on a base sheet in the form of a solution or an emulsion and dried, followed by hardening by irradiating electron beams.

The content of white pigment in the opaque resin coating layer is preferably 20 to 80% by weight, more preferably 20 to 70% by weight, based on the weight of the resin component in the layer. When the content is too small, the hiding power is undesirably lowered, while, when the content is too large, the ability of the resin as a binder becomes insufficient, and irradiation dose undesirably increases to give undesirable influences on the base sheet or the coating resin layer.

Figure 3:
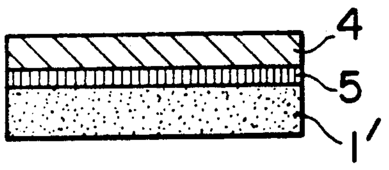

When a primer layer 5 is provided between the opaque resin coating layer 4 and the support 1' as shown in FIG. 3 unevenness of the support is reduced. As the resin used for forming the primer layer, there can be used polyolefin resins.

On the rear side of the support opposite to the opaque resin coating layer, there can be formed as a water-resistant resin layer a polyolefin resin coating layer obtained by a melt extrusion method, or a layer of EB resin hardened by irradiating electron beams. Further, in order to provide rear side writing properties, a conventional back coating layer can be formed on the polyolefin or EB resin layer.

Preparation of the opaque resin composition and coating method thereof are the same as those explained in the photographic support having the structure A.

The thickness of the opaque resin coating layer changes depending on the kind of base paper and the content of white pigment, and is preferably 5 to 100 μm, more preferably 5 to 50 μm. When the thickness is too thin, whiteness and non-transparency become insufficient and uniform coating becomes difficult. On the other hand, when the thickness is too thick, uniform coating becomes difficult and the quality is undesirably lowered.

When the EB resin is used in the opaque resin coating layer, the mirror finish or embossing finish can be carried out in the same manner as explained in the photographic support having the structure A. When the molten polyolefin resin is used, the mirror finish or embossing finish can be obtained using a suitable cooling roll.

The amount of the EB resin impregnated into the base paper changes depending on the distribution of the EB resin in the base sheet and the kind of the EB resin, and is preferably 1 to 20% by weight based on the weight of the base sheet after impregnated. When the amount is too small, adhesive strength of the base paper is lowered and prevention of the base sheet from penetration of developing chemicals is insufficient, while when the amount is too large, softness of the base sheet is undesirably lost.

Irradiation of the electron beam can be carried out in the same manner as described in the photographic support having the structure A, except that since no UV resin layer is formed, irradiation of electron beams is conducted in an oxygen concentration of 600 ppm or less, preferably 400 ppm or less, by replacing the air by an inert gas such as nitrogen, helium, carbon dioxide or the like.

It is possible to form the same UV resin layer 3 as in the structure A on the opaque resin coating layer 4 in FIG. 2 or FIG. 3.

A major object of impregnating the EB resin into the base sheet is to suppress lowering of adhesive strength of the base sheet, due to irradiation of electron beams and yellowing due to deterioration of the cellulose contained in the base sheet, and to prevent the base sheet from the penetration of developing chemicals into spaces among fibers in the base sheet. Since the object of impregnation with the EB resin is not to inhibit the migration of substances after hardening, it is not necessary to make the EB resin form a film having no pin holes on the surface of the base sheet so long as at least the surface portion of base sheet is reinforced with the EB resin. Therefore, there is no problem even if pulp fibers constituting the base sheet directly contact the opaque resin coating layer.

If necessary, the opaque resin coating layer may be covered with a polyolefin resin layer in order to provide smoothness, water resistance, chemical resistance, easiness in cleaning, adhesiveness to a photosensitive emulsion layer, and prevention of fogging of the photosensitive emulsion.

The resulting photographic support is then subjected to coating of a photosensitive emulsion on the opaque resin coating layer for producing photographic paper in a conventional manner.

The photographic support having the structure B has a support impregnated with the EB resin, particularly at the surface portion of the support, so that the adhesive strength between the opaque resin coating layer and the base sheet is not lowered even if exposed to irradiation of electron beams. Further, influences of irradiation of electron beams on the base sheet are reduced by the EB resin impregnated therein, so that the photographic support can maintain high quality without experiencing yellowing.

[STRUCTURE C]

Figure 4:
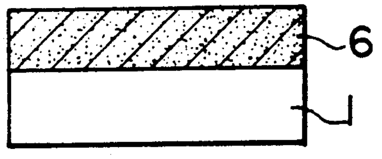

In order to prevent rib-like unevenness on a coated layer and lowering in adhesiveness to the photographic emulsion layer and photographic properties while maintaining sufficient hiding power and whiteness, the photographic support having a structure as shown in FIG. 4 is preferable.

That is, the photographic support having a structure as shown in FIG. 4 is preferable.

More specifically, the photographic support comprises a support 1 and a hardened layer 6 of a composition comprising a white pigment, an electron beam hardened resin (EB resin), and an electron beam hardenable leveling agent, hardened by electron beams and formed on one surface of the support.

When a white pigment is dispersed in the EB resin in high concentration, the viscosity of the EB resin-containing composition naturally increases so as to make it difficult to control a coating step using a coater. Also, a rib-like unevenness after is produced coating, which results in making it impossible to use the resulting photographic support practically. In order to remove such rib-like unevenness, there are used fluorine-containing compounds having a high leveling effect as a leveling agent, for example, fluoroalkyl carboxylic acids, perfluoroalkyl carboxylic acids, perfluorooctanesulfonic acid diethanolamide, N-propyl-N-(2-hydroxyethyl)perfluorooctanesulfonamide, phosphoric acid bis(N-perfluoroctylsulfonyl-N-ethylaminoethyl), monoperfluoroalkylethyl phosphoric acid esters, etc. The addition of such compounds to the EB resin may prevent the rib-like unevenness, but adhesiveness between the coated layer and a photosensitive emulsion layer to be formed is decreased due to diffusion of the leveling agent on the surface of the coated layer after hardening with electron beam irradiation.

Therefore, such usual leveling agents cannot be used in the present invention.

Instead, in the present invention, there are used electron beam hardenable leveling agents such as fluorine-containing compounds, e.g. fluorine-containing acrylates, perfluoroalkyl acrylates, fluorine-containing methacrylates, perfluoroalkyl methacrylates, etc.; silicone compounds, e.g. silicone-containing acrylates, silicone-containing methacrylates, derivatives thereof; acrylate modified hydrocarbon series surface active agents, methacrylate modified hydrocarbon series surface active agents, etc. Concrete examples of the electron beam hardenable leveling agents are as follows:

1) Fluorine containing acrylates and perfluoroalkyl acrylates

Compounds represented by the formula:

$CH_2{=}CHCOOC_nH_{2n}C_mF_{2m}H$, and $CH_2{=}CHCOOC_nH_{2n}C_nF_{2m+1}$, wherein m is an integer of 1 to 16 and n is an integer of 1 to 4 such as 2,2,2-trifluoroethyl acrylate, 2,2,3,3-tetrafluoropropyl acrylate, 1H,1H,5H-octafluoropentyl acrylate, 1H,1H, 2H, 2H-heptadecafluorodecyl acrylate, N-(n-propyl)-N-(8-acryloxyethyl)-perfluoroctylsulfonic acid amide, perfluoroalkylethyl acrylates, etc.

Commercially available compounds are BISCOAT 3F, 5F, 8F, 17F (mfd. by Osaka Organic Chemical Ind. Co., Ltd.), EF-125M (mfd. by Mitsubishi Metal Corp.), AE800, AE1014, Hoe T 3605 (Hoechst Japan Co.)

2) Fluorine-containing methacrylates and perfluoroalkyl methacrylates

Compounds represented by the formula:

$CH_2{=}C(CH_3)COOC_nH_{2n}C_mF_{2m}H$, and $CH_2{=}C(CH_3)COOC_nH_{2n}C_mF_{2m+1}$ wherein m is an integer of 1 to 16; and n is an integer of 1 to 4, such as 2,2,2-trifluoroethyl methacrylate, 2,2,3,3-tetrafluoropropyl methacrylate, 1H,1H,5H-octafluoropentyl methacrylate, 1H,1H,2H,2H-heptadecafluorodecyl methacrylate, N-(n-propyl)-N-(n-propyl)-N-(β-methacryloxyethyl)-perfluorosulfonic acid amide, perfluoroalkylethyl methacrylates, etc.

Commercially available compounds are BISCOAT 3MF, 4MF, 8MF, 17MF (mfd. by Osaka Organic Chemical Ind. Co., Ltd.), EF-135M (mfd. by Mitsubishi Metal Corp.) MAE-600, MAE-1014, MAE-800, Hoe T 3606 (Hoechst Japan Co.)

3) Silicone-containing acrylates, silicone-containing methacrylates and derivatives thereof Resins obtained by introducing one or more acryloyl groups or methacryloyl groups into terminals of a main chain or side chains of a general silicone resin (mainly polydimethylsiloxane).

Commercially available compounds are FMO 711, FMO 721, FMO 725, PS 583 (Chisso Corp.); KP-600, X-62-7140, X-62-7144, X-62-7153, X-62-7153, X-62-7158, KNS-5200, X-62-7166, X-62-7168, X-62-7177, X-62-7180, (mfd. by Shin-etsu Chemical Industry Co., Ltd.); RC 149, RC 300, RC 450, RC 802, RC 710, RC 720 (Th. Goldschmidt AG.).

4) Acrylate modified hydrocarbon series surface active agents and methacrylates modified hydrocarbon series surface active agents Surface active agents having an acryloyl group or a methacryloyl group at a terminal or a side chain of a hydrocarbon and a functional group of a sulfonic acid salt or phosphoric acid salt at another terminal or a side chain.

Commercially available compounds are H-3355N, H-3355S (mfd. by Dai-ichi Kogyo Seiyaku Co., Ltd.).

The amount of electron beam hardenable leveling agent added changes depending on the kind of EB resins and the contents of titanium oxide, and is preferably 0.0001% to 5% by weight based on the weight of the EB resin. When the amount is too small, the leveling effect is insufficient, while when the amount is too much, not only the dispersion of the leveling agent is worsened but also the adhesiveness to a photosensitive emulsion layer after hardening with electron beams is worsened.

A composition comprising a white pigment, an EB resin and an electron beam hardenable leveling agent can be prepared in the same manner as described in the explanation of the structure A.

The amount of the white pigment is preferably 20 to 80% by weight, more preferably 20% to 70% by weight, based on the weight of the EB resin due to the same reasons as described in the structure A.

On the rear side of the support opposite to the EB resin-pigment-leveling agent layer, there can be formed as a water-resistant resin layer a polyolefin resin coating layer obtained by a melt extrusion method, or an EB resin layer hardened by irradiation of electron beams.

Coating and hardening of the EB resin-white pigment-leveling agent layer can be carrid out in the same manner as described in the structure A.

The thickness of the EB resin-white pigment-leveling agent layer changes depending on the kind of base sheet, and is preferably 5 to 100 μm, more preferably 5 to 50 μm. When the thickness is too thin, the layer is easily influenced by unevenness of the base sheet and easily produces pin holes. On the other hand, when the thickness is too thick, uniform coating becomes difficult and uniform hardening also becomes difficult. This is not preferable from the viewpoint of quality.

Irradiations of the electron beam can be carried out in the same manner as described in the photographic support having the structure A, except that since no UV resin layer is formed, irradiation of electron beams is conducted in an oxygen concentration of 600 ppm or less, preferably 400 ppm or less, by replacing the air by an inert gas such as nitrogen, helium, carbon dioxide or the like.

It is possible to form the same UV resin layer 3 as in the structure A on the EB resin-white pigment-leveling agent layer.

The resulting photographic support can be treated with a radical polymerization inhibitor to remove effects of living radicals after curing.

If necessary, mirror finish or embossing finish can be applied in the same manner as described in the structure A.

Other techniques and things described in the structures A and B can also be applied to the structure C, if necessary.

The resulting photographic support is then subjected to coating with a photosensitive emulsion on the EB resin-white pigment-leveling agent layer for producing photographic paper in a conventional manner.

The photographic support having the structure C can be produced easily with good coating properties even if a white pigment is contained in high content. Further, since the leveling agent radical polymerizes with surrounding EB resin, it does not bleed out on the surface of the EB resin-white pigment-leveling agent layer, which results in making the photographic support excellent in photographic properties without causing fogging after forming the photosensitive emulsion layer and without lowering the adhesiveness to the photosensitive emulsion layer.

[STRUCTURE D]

Figure 5:
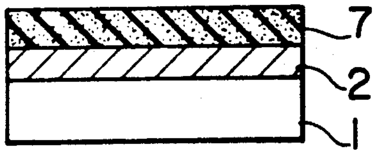

In order to provide sufficient whiteness and to prevent fogging of a photographic emulsion layer, the photographic support having a structure as shown in FIG. 5 is preferable.

That is, the photographic support comprises a support 1, a hardened layer (EB resin-pigment layer) 2 of a composition comprising a white pigment and an EB resin formed on the support, and a fluorescent agent-resin layer 7 of a composition comprising a fluorescent agent and an EB resin.

The thickness of the fluorescent agent-resin layer is preferably 5 μm or less. The EB resin-pigment layer and/or the fluorescent agent-resin layer may contain an electron beam hardened leveling agent. Further, the fluorescent agent-resin layer may contain a photopolymerization initiator.

Figure 6:
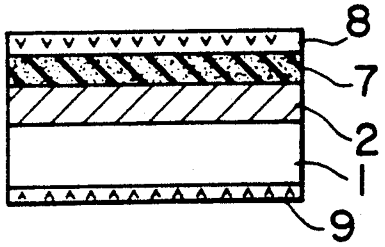

The photographic support may have a hydrophilic coating layer 8 and/or a water-resistant resin layer 9 as shown in FIG. 6.

The photographic support having the structure D can be produced by various methods. One method comprises coating a composition comprising a white pigment and an EB resin, hardening the composition by irradiation with electron beams to form an EB resin-pigment layer, coating a composition comprising a fluorescent agent and an EB resin on the EB resin-pigment layer, and hardening the composition by irradiation with electron beams to form a fluorescent agent-resin layer. Another method comprises coating a composition comprising a white pigment and an EB resin, coating a composition comprising an EB resin and a fluorescent agent thereon, and hardening both compositions simultaneously by irradiation with electron beams. A further method comprises coating a composition comprising a white pigment and an EB resin, hardening the composition by irradiation with electron beams to form an EB resin-pigment layer, coating a composition comprising a fluorescent agent, an EB resin and a photopolymerization initiator on the EB resin-pigment layer, and hardening the composition by irradiation with UV rays to form an fluorescent-resin layer. In this case, the irradiation with the electron beams can be omitted but conducted after or before the irradiation with the UV rays. Further, the composition comprising a fluorescent agent and an EB resin can be coated by a so-called gravity-drop vertical curtain coating method.

Since irradiation with electron beams causes yellowing of the base sheet (or support) and the EB resin-pigment layer and lack of whiteness, it is inevitable to add a fluorescent agent and/or a blue dye. Further, since almost incident light is reflected by dispersed white pigment in high content, the fluorescent agent which acts effectively is very small in amount. In order to exhibit the function of fluorescent agent suppressed by hiding effect of the white pigment, it is necessary to use the fluorescent agent in high content. In addition, when the white pigment is dispersed in the EB resin in high content, electron beam hardening properties of the EB resin-pigment composition are remarkably lowered and the electron beam irradiation dose necessary for forming the EB resin-pigment layer increases. But the increase of the irradiation dose sometimes causes decomposition of the fluorescent agent, which results in not only lowering the fluorescent function but also causing a fatal problem of fogging of the photographic emulsion layer due to diffusion of the decomposed fluorescent agent into the photographic emulsion layer with the lapse of time.

On the other hand, when the irradiation dose is small, the fluorescent agent is damaged slightly, but the hardening of the EB resin becomes insufficient and adaptability to the development is also lowered, which results in causing fogging of the photographic emulsion layer.

By employing the structure D, the problems of whiteness, brightness, fogging of the emulsion layer, the amount of fluorescent agent, resolving power, gloss, electron beam irradiation dose, and the like are solved at once.

The EB resin-pigment layer can be formed in the same manner as described in the structure A.

As the fluorescent agent, there can be used those conventionally used in natural fibers, animal fibers, synthetic fibers, fats and oils, and plastics.

Examples of the fluorescent agent are 4,4'-bis(4,6-disubstituted-1,3,5-triazinyl-2-amino)stilbene-disulfonic acid and derivatives thereof; α,β-bis(benzoxazolyl-)ethylene and derivatives thereof; alkoxynaphthalic acid-N-substituted imides; benzoxazole derivatives; coumarin derivatives; oxazole derivatives, e.g., bis(alkyl substituted benzoxazolyl)thiophenes such as 2,5-bis(5'-t-butylbenzoxazolyl-2')thiophene (UVITEX OB, a trade name, mfd. by Ciba-Geigy Corp.) etc., bis(alkyl substituted benzoxazolyl)naphthalene such as 1,4-di(benzoxazolyl-2')naphthalene (HOSTALUX KCB, a trade name, mfd. by Farbwerke Hoechst AG.), etc., and bis-(alkyl substituted benzoxazolyl)stilbene such as 1,2-bis(5'-t-butylbenzoxazolyl-2')silbene, etc.; triazolylstilbene sulfonic acid derivatives, e.g. 4-naphthotriazolylstilbene sulfonic acid phenyl-2-phenoxysulfonyl-4-[2H naphtho-(1,2-d)triazol-2-yl]stilbene (CHINOPEARL PCR, a trade name, mfd. by Ciba-Geigy Corp.), 4-benzotriazolylstilbene-2,2'-disulfonic acid tolyl, 4-benzotriazolyl-2-sulfonic acid tolyl, 4-benzotriazolylstilbene-3,3'-disulfonic acid methyl, etc., these being conventionally used in thermoplastic resins.

Since cold curing is employed in the present invention, one can prevent defects caused by lack of heat resistance such as decomposition by heating, lowering of heat resistance of polyethylene, bleeding out of a fluorescent agent in a resin layer to damage stabilization of color tone, lowering in adhesiveness of the photosensitive emulsion layer caused by bleeding out of a fluorescent agent, yellowing of resin layers after development and fixing of photographic paper, and the like. Further, since the EB resin can be hardened by taking three dimensional crosslinking structure, the fluorescent agent is very difficult to bleed out. In addition, a color change of fluorescent agent can be prevented, since penetration of a developing solution and a fixing treating solution is very slight.

The amount of fluorescent agent in the fluorescent agent-resin layer is preferably 0.01% to 1.00% by weight based on the weight of the EB resin. When the amount is too small, fluorescent brightening effect is insufficient, while when the amount is too large, not only the adhesiveness of the photosensitive emulsion layer is lowered but also yellowing of the fluorescent agent becomes remarkable.

The fluorescent agent-resin layer can be hardened by irradiation with electron beam of preferably 1 to 8 Mrad in absorption dosage. When the absorption dosage is less than 1 Mrad, hardening is insufficient to cause bleeding out of the fluorescent agent after hardening. On the other hand, when the absorption dosage is more than 8 Mrad, the composition comprising the fluorescent agent and the EB resin is decomposed to cause bad influences on the photosensitive emulsion layer formed on the fluorescent agent-resin layer.

The fluorescent agent-resin layer can also be hardened by UV rays in the same manner as described in the structure A. In this case, the same photopolymerization as described in the structure A is included in the fluorescent agent-resin layer.

On the rear side of the support opposite to the EB resin-pigment layer and the fluorescent agent-resin layer, there can be formed as a water-resistant resin layer, a polyolefin resin coating layer obtained by a melt coating method, or a layer of EB resin hardened by irradiating electron beams.

The EB resin-pigment layer may further contain the same leveling agent as used in the structure C in the same manner as described in the structure C.

The surface of base sheet can be subjected to a surface treatment such as a corona discharge treatment in the same manner as described in the structure A.

The compositions of an EB resin and a white pigment and the composition of a fluorescent agent and an EB resin can be prepared and coated in the same manner as described in the structure A. In the coating method, it is also possible to use a curtain coating method, a die coating method, a gravity-drop vertical curtain coating method, an extrusion coating type vertical coating method, a curtain coating type slide method, a curtain coating type non-slide method, an extrusion coating type non-slide hopper method and an extrusion coating type slide hopper method, and the like method using a head. In the coating of the composition comprising a fluorescent agent and an EB resin, the gravity-drop vertical curtain coating method which is a non-contact coating method is most suitable considering the surface to be coated is smooth and in a liquid state.

The EB resin-pigment layer can be formed in the same manner as described in the structure A.

Irradiation with electron beams can be carried out in the same manner as described in the structure A, except that since no UV resin layer is formed, irradiation of electron beams is conducted in an oxygen concentration of 600 ppm or less, preferably 400 ppm or less, by replacing the air by an inert gas such as nitrogen, helium, carbon dioxide or the like.

Irradiation with UV rays can be carried out in the same manner as described in the structure A for forming the UV resin layer.

The resulting photographic support can be treated with a radical polymerization inhibitor.

If necessary, mirror finish or embossing finish can be applied in the same manner as described in the structure A.

Other techniques and things described in the structures A, B and C can also be applied to the structure D, if necessary.

The hydrophilic coating layer can be formed using an aqueous solution, an organic solvent dispersion or a latex of a hydrophilic compound, by a conventional method, so as to reduce influences of bleeding out of the fluorescent agent and to improve adhesiveness to the photosensitive emulsion layer. As the hydrophilic compound, there can be used natural high polymeric compounds such as hydrophilic protective colloid, a gelatin derivative, etc., and synthetic high polymeric compounds such as polyvinyl alcohol, polyvinyl pyrrolidone, polyacrylamide, etc.

Further, the water-resistant resin layer 9 in FIG. 6 can be formed on the rear side of the base sheet using a polyolefin resin as mentioned above, an EB resin, etc. by a conventional method.

The resulting photographic support is then subjected to coating of a photosensitive emulsion on the fluorescent agent-resin layer or the hydrophilic coating layer.

In the structures A through D, an anti-static layer, an anti-blocking layer, a writing property imparting layer, and the like conventionally used back-coating layer(s) can be formed on the water-resistant resin layer.

The present invention is illustrated by way of the following Examples, in which all percents and parts are by weight unless otherwise specified.

EXAMPLE 1

A base sheet (paper) having a basis weight of 120 $g/m^2$ and a laminate coating of 20 μm thick of polyethylene resin [a 1:1 mixture of low-density polyethylene (density 0.918 $g/m^3$, MI 5) and high-density polyethylene (density 0.965 $g/m^3$, MI 7)] on the rear side thereof, was subjected to a corona discharge treatment on the front side thereof, Then, a composition comprising 50% of rutile-type $TiO_2$ and 50% of an EB resin was coated so as to make the thickness 20 μm after hardened. As the EB resin, a 1:1 mixture of trimethylolpropane triacrylate and 1,6-hexanediol diacrylate was used. The mixing of the EB resin with rutile-type $TiO_2$ was carried out using a three-roll mill. Then, a UV hardened resin composition comprising 99% of the same EB resin as mentioned above as a UV curable resin and 1% of benzyl dimethyl ketal as a photopolymerization initiator was coated on the EB resin-pigment composition layer so as to make the thickness 2 μm after hardened.

The resulting sheet was placed in a UV irradiation apparatus (80 W/cm, ozone condensing type, irradiation distance 10 cm) and hardened on the surface layer by exposing to UV rays. Then, the resulting sheet was placed in an electron beam irradiation apparatus (Electrocurtain mfd. by Energy Science Inc.), wherein the air was replaced by nitrogen (oxygen concentration 5000 ppm). Electron beam irradiation was conducted under conditions of accelerating voltage of 175 KV and absorption dosage of 1 Mrad to harden the EB resin-pigment composition layer. As a result, a photographic support was produced.

EXAMPLE 2

A photographic support was produced in the same manner as described in Example 1 except for using the same composition as used in the UV curable resin composition, as the EB resin-pigment composition as follows:

| | |
|---|---|
| Rutile-type $TiO_2$ | 49% |
| EB resin | 50% |
| Photopolymerization initiator | 1% |

EXAMPLE 3

A photographic support was produced in the same manner as described in Example 1 except that irradiation with electron beam was conducted at the absorption dosage of 4 Mrad, without replacing the air by nitrogen gas, in the electron beam irradiation apparatus.

EXAMPLE 4

A photographic support was prepared in the same manner as described in Example 1 except that irradiation with UV rays was not conducted, but irradiation with electron beam was conducted at the absorption dosage of 1 Mrad, followed by irradiation with UV rays to harden the surface layer of the resulting sheet.

COMPARATIVE EXAMPLE 1

A photographic support was produced in the same manner as described in Example 1 (including irradiation with UV rays) except for not forming the layer of UV hardened resin composition.

COMPARATIVE EXAMPLE 2

A photographic support was produced in the same manner as described in Example 2 except for not using irradiation with UV rays.

COMPARATIVE EXAMPLE 3

A photographic support was produced in the same manner as described in Example 2 except that the EB hardened resin composition of Example 2 was used as it was, irradiation with UV rays was not conducted, and irradiation with electron beam was conducted in the electron beam irradiation apparatus by replacement with nitrogen gas at the oxygen concentration of 200 ppm.

COMPARATIVE EXAMPLE 4

A photographic support was produced in the same manner as described in Example 1 except that irradiation with electron beam was conducted at the absorption dosage of 1 Mrad without conducting irradiation with UV rays.

Using the photographic supports obtained in Examples 1 to 4 and Comparative Examples 1 to 4, adhesiveness to a photographic emulsion layer and photographic suitability were examined as follows.

[Adhesiveness]

On a photographic support, an ordinary photographic emulsion layer was formed and hardened in a conventional method. Dried photographic emulsion layer was cut with a predetermined distance to provide small squares. An adhesive tape was stuck thereon and peeled off. Remaining squares on the photographic support was counted and used for evaluation of adhesiveness at a dry state. On the other hand, a photographic emulsion was coated on a photographic support and hardened, followed by a series of developing treatment. In wet state, the photographic emulsion layer was cut with a predetermined distance and rubbed with a finger to evaluate adhesiveness at a wet state.

[Change in whiteness]

Whiteness of a photographic support having a gelatin layer thereon was measured before and after development using a digital hunter reflectance measuring device to evaluate retention of treating chemicals. The smaller the whiteness changing rate becomes, the smaller the retention of the treating chemicals at the development becomes. Generally speaking, when hardening of a resin layer is insufficient, the whiteness changing rate becomes larger.

The results are shown in Table 1.

TABLE 1

| Example No. | Adhesiveness | | Whiteness changing |
|---|---|---|---|
| | Dry state | Wet state | rate (%) |
| Example 1 | 100 | Excellent | 0.8 |
| Example 2 | 100 | Excellent | 0.8 |
| Example 3 | 100 | Excellent | 2.2 |
| Example 4 | 100 | Excellent | 1.0 |
| Comparative | | | |
| Example 1 | 7 | Poor | 24 |
| Example 2 | 5 | Poor | 35 |
| Example 3 | 92 | Good | 4 |
| Example 4 | 9 | Poor | 22 |

As is clear from Table 1, since the photographic supports of the present invention are not produced by the melt extrusion method, there are no problems with gloss such as satin-like surface and transverse stripe unevenness. Further, adhesiveness of the photographic emulsion layer at the dry state and wet state is excellent in the present invention compared with the photographic supports obtained by hardening by irradiation of only electron beam. In addition, since nitrogen replacement at the time of electron beam irradiation can be in a small amount, the process of the present invention has an economical advantage. Still further, the photographic supports of the present invention are small in retention of chemicals after the development, which results in giving photographic paper excellent color reproducibility and resistance to color fading.

EXAMPLE 5

A base sheet (paper) having a basis weight of 120 $g/m^2$ and a laminate coating of 18 μm thick of polyethylene resin [a 1:1 mixture of low-density polyethylene (density 0.918 $g/cm^3$, MI 5) and high-density polyethylene (density 0.965 $g/cm^3$, MI 7)] on the rear side thereof, was impregnated with trimethylolpropane triacrylate as an EB resin by a tub press on the front side so as to make an average weight of 10 $g/m^2$. The resulting base sheet was placed in an electron beam irradiation apparatus (Electrocurtain, mfd. by Energy Science Inc.) substituted with nitrogen (oxygen concentration 200 ppm) and subjected to electron beam irradiation at an accelerating voltage of 175 KV and absorption dosage of 2 Mrad to harden the EB resin impregnated into the base sheet.

The resulting base sheet was subjected to a corona discharge treatment. Then, a composition for forming an opaque resin coating layer comprising

| | |
|---|---|
| rutile-type | 50% |
| EB resin | 50% |

mixed by using a three-roll mill was coated on the front side of the base sheet so as to make the average thickness 5 μm, followed by irradiation of electron beam of 2 Mrad for hardening in the electron beam irradiation apparatus to provide a photographic support.

As the EB resin, a mixture of 75% of a 1:1 mixture of α,ω-tetraacryloyl-bis(trimethylolpropane) tetrahydroacrylate and trimethylolpropane acrylate and 25% of 1,6-hexanediol diacrylate was used.

EXAMPLE 6

A photographic support was produced in the same manner as described in Example 5 except that the EB resin-$TiO_2$ composition was coated on the front side of the base sheet without irradiation with electron beam, followed by irradiation of electron beam of 4 Mrad for hardening both the EB resin impregnated into the base sheet and the EB resin-$TiO_2$ composition simultaneously.

EXAMPLE 7

On the front side of a base sheet obtained in the same manner as described in Example 5, after impregnation with trimethylolpropane triacylate as the EB resin by the tub press, a composition comprising 30 parts of a master batch obtained by kneading low-density polyethylene (density 0.918 $g/cm^3$, MI 18.5) with 30% of $TiO_2$, 45 parts of low-density polyethylene (density 0.918 $g/cm^3$, MI 5), and 25 parts of high-density polyethylene (density 0.965 $g/cm^3$, MI 7) was laminate coated to a thickness 20 μm to form an opaque resin coating layer. Then, the resulting sheet was exposed to electron beam from the polyolefin resin layer side with absorption dosage of 5 Mrad to cure the EB resins for producing a photographic support.

EXAMPLE 8

On the front side of a base sheet obtained in the same manner as described in Example 5, after impregnation with trimethylolpropane triacrylate as the EB resin by the tub press, a primer layer of 7 μm thick was formed by laminate coating a resin composition comprising 75 parts of low-density polyethylene (density 0.918 $g/cm^3$, MI 5) and 25 parts of high-density polyethylene (density 0.965 $g/cm^3$, MI 7). After corona discharge treatment, the same composition as used in Example 5 was coated to form an opaque resin coating layer. After irradiating with electron beam of absorption dosage of 5 Mrad for hardening the EB resin and the opaque resin coating layer, a photographic support was obtained.

COMPARATIVE EXAMPLE 5

A photographic support was produced in the same manner as described in Example 5 except for not impregnating the base sheet with the EB resin and using electron beam of 4 Mrad.

COMPARATIVE EXAMPLE 6

A photographic support was produced in the same manner as described in Example 8 except for not impregnating the base sheet with the EB resin.

[Evaluation of adhesiveness and whiteness]

Each photographic support obtained in Examples 5 to 8 and Comparative Examples 5 and 6 was subjected to a corona discharge treatment and coating of colored halogenated silver photographic emulsion in a conventional manner to provide photographic paper. After subjecting to a series of development treatment, adhesiveness was tested as follows. A photographic paper was dried and cut with a predetermined distance to provide small squares. An adhesive tape was sticked thereon and peeled off instantly. A surface state of photographic paper (peeling states of the emulsion layer, the opaque resin coating layer and the base sheet) was evaluated.

Yellowing of photographic paper, particularly the base sheets, was evaluated by comparing whiteness of the rear sides of the photographic papers with whiteness of the rear side of photographic paper obtained from a support laminated with a polyolefin resin on both front and rear sides.

The results are shown in Table 2.

TABLE 2

| | Adhesiveness | | | |
|---|---|---|---|---|
| Example No. | Emulsion layer | Opaque resin layer | Base sheet | Whiteness |
| Example 5 | Good | Good | Good | Good |
| Example 6 | Good | Good | Good | Good |
| Example 7 | Good | Good | Good | Good |
| Example 8 | Good | Good | Good | Good |
| Comparative | | | | |
| Example 5 | Pealed | Pealed | Pealed | Slightly yellowed |
| Example 6 | Pealed partly | Pealed partly | Pealed partly | Slightly yellowed |

As is clear from Table 2, since the EB resin is impregnated into at least the surface portion of the base sheet in the present invention, good adhesiveness can be maintained even if electron beam is irradiated to cure the opaque resin coating layer. Further, since influences of irradiation with electron beam on the base sheet are reduced by the EB resin impregnated into the base sheet, one obtains photographic supports of high quality without which do not yellowing.

EXAMPLE 9

A base sheet (paper) having a basis weight of 120 g/$m^2$ and a laminate coating of 20 μm thick of polyethylene resin [a 1:1 mixture of low-density polyethylene (density 0.918 g/$cm^3$, MI 5) and high-density polyethylene (density 0.965 g/$cm^3$, MI 7)] on the rear side thereof, was subjected to a corona discharge treatment on the front side thereof. Then, an electron beam hardenable composition comprising:

| | |
|---|---|
| rutile-type $TiO_2$ | 50% |
| EB resin | 49.8% |
| electron beam hardened leveling agent | 0.2% |

mixed by using a three-role mill was coated on the front side of the base sheet using an offset gravure coater, followed by smoothing using a smoothing bar to form a layer of 10 μm thick. The resulting sheet was placed in an electron beam irradiation apparatus (Electrocurtain, mfd. by Energy Science Inc.) substituted with nitrogen (oxygen concentration 200 ppm) and subjected to electron beam irradiation at an accelerating voltage of 175 KV and absorption dosage of 4 Mrad to produce a photographic support.

As the EB resin, there was used triacrylate ester of pentaerythritol acrylic acid adduct. As the electron beam hardenable leveling agent, there was used perfluoroalkylethyl acrylate of the formula:

$C_8F_{17}C_2H_4OCOCH{=}CH_2$

EXAMPLE 10

The process of Example 9 was repeated except for using 0.6% of polydimethylsiloxane tetraacrylate as the electron beam hardenable leveling agent and 49.4% of the same EB resin as used in Example 9.

EXAMPLE 11

The process of Example 9 was repeated except for using 1.0% of acrylate modified surface active agent as the electron beam hardenable leveling agent and 49.0% of the same EB resin as used in Example 9.

COMPARATIVE EXAMPLE 7

The process of Example 9 was repeated except for using a leveling agent having no electron beam hardenable functional group (perfluoalkyl ethanol: $C_8F_{27}C_2H_4OH$) in place of the electron beam hardenable leveling agent.

COMPARATIVE EXAMPLE 8

The process of Example 10 was repeated except for using a leveling agent not having a electron beam hardenable functional group (polydimethylsiloxane carboxylate), in place of the electron beam hardenable leveling agent.

COMPARATIVE EXAMPLE 9

The process of Example 11 was repeated except for using a leveling agent having no electron beam hardenable functional group (alkyl sulfonic acid ester) in place of the electron beam hardenable leveling agent.

COMPARATIVE EXAMPLE 10

The process of Example 9 was repeated except for not using the electron beam hardenable leveling agent but using 50% of the same EB resin as used in Example 9.

[Coating properties]

The electron beam hardenable compositions obtained in Examples 9 to 11 and Comparative Examples 7 to 10 were coated on a base sheet using an offset gravure coater, smoothed using a smoothing bar and hardened by irradiation with electron beam. Coating properties were evaluated by the degree of generation of rib-like unevenness on the coated surface by the naked eye.

[Adhesiveness test]

On each photographic support obtained in Examples 9 to 11 and Comparative Examples 7 to 10, a photographic emulsion layer was formed and hardened by a conventional method. After standing stand at 50° C. for one month, the resulting photographic paper was subjected to a series of developing treatment. After development, the emulsion layer was cut in wet state with a constant distance to give squares, subjected to strong rubbing with a piece of gauze and evaluated as to the degree of peeling.

The results are shown in Table 3.

TABLE 3

| Example No. | Coating properties | Adhesiveness |
|---|---|---|
| Example 9 | Excellent | Excellent |
| Example 10 | Excellent | Excellent |
| Example 11 | Good | Excellent |
| Comparative Example 7 | Excellent | Slightly poor |
| Comparative Example 8 | Excellent | Slightly poor |
| Comparative Example 9 | Good | Slightly poor |
| Comparative Example 10 | Slightly poor | Excellent |

As is clear from Table 3, in photographic papers obtained from the photographic supports of Examples 9 to 11, since the leveling agents are radical polymerized with the EB resin, fogging of the photosensitive emulsion layer hardly takes place unlike Comparative Example 10. Further, the test for retention of developing solution was good. Thus, the photographic supports of Examples 9 to 11 can be used practically.

As mentioned above, since the photographic supports of the present invention are not produced by the melt extrusion method, there are no problems in gloss such as satin-like surface and transverse stripe unevenness. Further, even if a white pigment such as titanium dioxide is mixed with the EB resin in high content, coating properties are rather improved with preventing defects such as rib-like unevenness and preventing lowering in adhesiveness to the photographic emulsion layer. In addition, since the leveling agent is radical polymerized with surrounding EB resin, no fogging of the photographic emulsion layer takes place. Still further, since the retention of chemicals after the development is slight, the photographic supports of the present invention can provide photographic paper excellent in color reproducibility and resistance to color fading.

EXAMPLE 12

A base sheet (paper) having a basis weight of 120 g/$m^2$ and a coating of 20 μm thick of polyethylene resin [a 1:1 mixture of low-density polyethylene (density 0.918 g/$cm^3$, MI 5) and high-density polyethylene (density 0.965 g/$cm^3$, MI 7)] obtained by melt extrusion on the rear side thereof, was subjected to a corona discharge treatment on the front side thereof. Then, an electron beam hardened resin composition comprising:

| | | |
|---|---|---|
| rutile-type $TiO_2$ | 50 | parts |
| EB resin | 49.8 | parts |
| electron beam hardened leveling agent | 0.2 | part |

was coated on the front side using an offset gravure coater so as to make the thickness 10 μm and smoothed using a smoothing bar. The resulting base sheet was placed in an electron beam irradiation apparatus (Curetron, mfd. by Nisshin High Voltage Col., Ltd.) substituted with nitrogen (oxygen concentration 200 ppm) and subjected to irradiation with electron beam at an accelerating voltage of 200 KV and absorption dosage of 2 Mrad to produce a photographic support having a hardened layer of EB resin, $TiO_2$ and the leveling agent.

As the EB resin, a 1:1 mixture of triacrylate ester of pentaerythritol acrylic acid adduct and trimethylolpropane triacrylate was used. As the electron beam hardenable leveling agent, perfluoroalkylethyl acrylate of the formula: $C_8F_{17}C_2H_4OCOCH{=}CH_2$ was used. Mixing of the composition was carried out using a three-roll mill.

EXAMPLE 13

A fluorescent resin composition was prepared by mixing a 1:1 mixture of triacrylate ester of pentaerythritol acrylic acid adduct and trimethylolpropane triacrylate as an EB resin, 0.20% of perfluoroalkylethyl acrylate of the formula: $C_8F_{17}C_2H_4OCOCH{=}CH_2$ as an electron beam hardenable leveling agent, and 0.20% of 2,5-bis(5'-t-butylbenzoxazolyl-2')thiophene (UVITEX OB, a trade name, mfd. by Ciba-Geigy Corp.) as a fluorescent agent. The resulting composition was coated on the hardened layer of EB resin, $TiO_2$ and the leveling agent obtained in Example 12 using an offset gravure coater so as to make the thickness 0.5 μm and smoothed using a smoothing bar. Then, irradiation with electron beam was conducted in the same manner as described in Example 12 with the absorption dosage of 1 Mrad. Thus, a photographic support having the structure as shown in FIG. 5 was produced.

EXAMPLE 14

On the same base sheet as used in Example 12, the same electron beam hardened resin composition as used in Example 12 was coated using an offset gravure coater so as to make the thickness 10 μm, followed by smoothing using a smoothing bar. Then, the same electron beam hardened resin and fluorescent agent composition as used in Example 13 was coated thereon using a gravity-drop vertical curtain coating method so as to make the thickness 0.5 μm. Then, the resulting sheet was subjected to irradiation with electron beam without smoothing in the same manner as described in Example 12 with the absorption dosage of 2 Mrad. Thus, a photographic support having the structure as shown in FIG. 5 was produced.

EXAMPLE 15

A fluorescent agent resin composition was prepared by mixing a 1:1 mixture of triacrylate ester of pentaerythritol acrylic acid adduct and trimethylolpropane triacrylate as an EB resin, 2% of benzyl dimethyl ketal (IRGACURE 651, a trade name, mfd. by Ciba-Geigy Corp.) as a photopolymerization initiator, 0.2% of perfluoroalkylethyl acrylate of the formula: $C_8F_{17}C_2H_4OCOCH{=}CH_2$ as an electron beam hardenable leveling agent, and 0.25% of 2,5-bis(5'-t-butylbenzoxazolyl-2')thiophene (UVITEX OB, a trade name, mfd. by Ciba-Geigy Corp.). The resulting composition was coated on the electron beam hardened resin composition layer formed on the base sheet obtained in Example 12 using a gravity-drop vertical curtain coating method to make the thickness 0.5 μm. The resulting support having a layer of the fluorescent agent resin composition thereon was placed in a UV rays irradiation apparatus (80 W/cm, ozone condenser type, irradiation distance 10 cm) and subjected to hardening by irradiation with UV rays to give a photographic support having the structure as shown in FIG. 5.

EXAMPLE 16

On the fluorescent agent resin layer of the photographic support obtained in Example 13, a hydrophilic coating layer containing gelatin as a major component was formed to give a photographic support having a top coat layer.

EXAMPLE 17

The same base sheet having a polyethylene laminated coating as used in Example 12 was subjected to a corona discharge treatment on the front side. Then, an electron beam hardened resin composition comprising:

| | | |
|---|---|---|
| rutile-type $TiO_2$ | 50 | parts |
| EB resin | 49.3 | parts |
| fluorescent agent | 0.5 | part |
| electron beam hardened leveling agent | 0.2 | part |

was coated on the front side so as to make the thickness 10 μm using an offset gravure coater, followed by smoothing using a smoothing bar. The electron beam irradiation was carried out in the same manner as described in Example 12 to produce a photographic support having an electron beam hardened resin coating layer containing the fluorescent agent.

The materials used for forming the electron beam hardened resin composition were the same as used in Example 13. The total weight of the fluorescent agent was adjusted so as to be 4 times as large as the used amount in Example 13.

EXAMPLE 18

The process of Example 13 was repeated except for making the thickness of the fluorescent agent resin layer 8 μm.

The photographic supports obtained in Examples 12 to 18 were examined in brightness, whiteness, and bleeding out. Photographic paper obtained from these photographic supports were examined in fogging and resolving power.

The results are shown in Table 4.

TABLE 4

| Example No. | Brightness | Whiteness | Bleeding out | Fogging | Resolving power |
|---|---|---|---|---|---|
| Example 13 | Excellent | Excellent | Slightly | None | Excellent |
| Example 14 | Excellent | Excellent | Slightly | None | Excellent |
| Example 15 | Excellent | Excellent | Slightly | None | Excellent |
| Example 16 | Excellent | Excellent | Slightly | None | Excellent |
| Example 12 | Slightly poor | Slightly poor | None | None | Excellent |
| Example 17 | Slightly poor | Slightly poor | Relatively many | Some | Excellent |
| Example 18 | Excellent | Excellent | Relatively many | Some | Slightly poor |

As mentioned above, since the photographic supports of the present invention are not produced by the melt extrusion method, there are no problems with gloss such as satin-like surface and transverse stripe unevenness. Further, by forming the fluorescent agent resin layer on the layer containing a white pigment and an EB resin, decomposition of the fluorescent agent by irradiation with electron beam is reduced to prevent not only fogging of the photosensitive emulsion layer but also a bleeding out phenomenon due to the presence of the fluorescent agent in the resin layer crosslinked three-dimensionally by irradiation with electron beam. Therefore, no undesirable influences on color tone of the photosensitive emulsion layer and the adhesiveness were exhibited. Further, since incident light is not reflected by the white pigment, the fluorescent brightening effect of the fluorescent agent can be used effectively to reduce the using amount thereof. Such effects cannot be obtained in the prior art technique such as melt laminating method of thermoplastic resins, or a laminating method using a uniformly mixed composition comprising a white pigment/fluorescent agent and an electron curable resin.

What is claimed is:

1. A photographic support comprising a base sheet, a hardened layer having a thickness of 5 to 100 $\mu m$ obtained from a composition comprising a white pigment and an electron beam hardened resin, said composition formed on one surface of the base sheet, and a hardened layer having a thickness of 0.1 to 10 $\mu m$ obtained from a composition comprising an ultraviolet hardened resin and a photopolymerization initiator, said latter composition formed on the hardened layer containing the electron beam hardened resin.

2. A photographic support according to claim 1, wherein the hardened layer containing the ultraviolet hardened resin further contain a white pigment.

3. A photographic support comprising a base sheet obtained by impregnating an electron beam hardenable resin containing tri- or higher polyfunctional acrylate thereinto, followed by hardening with irradiation of electron beams, and an opaque resin coating layer containing a white pigment, formed on one surface of the base sheet, wherein the electron beam hardened resin-pigment layer has a film thickness of 5 to 100 $\mu m$.

4. A photographic support according to claim 3, wherein a primer layer obtained by melt extruding a polyofefin resin is formed between the base sheet and the opaque resin coating layer.

5. A photographic support according to claim 3, wherein the opaque resin coating layer comprises a white pigment and an electron beam hardened resin and hardened by irradiation with electron beams.

6. A photographic support comprising a base sheet and a hardened layer obtained from a composition comprising a white pigment, an electron beam hardened resin, and an electron beam hardenable leveling agent, formed on one surface of the base sheet, electron beam irradiation being conducted in an oxygen concentration of 660 ppm or less, wherein the electron beam hardened resin-pigment layer has a film thickness of 5 to 100 $\mu m$.

7. A photographic support according to claim 6, wherein the electron beam hardenable leveling agent is a fluorine-containing acrylate or a perfluoroalkyl acrylate.

8. A photographic support according to claim 6, wherein the electron beam hardenable leveling agent is a silicone-containing acrylate.

9. A photographic support according to claim 6, wherein the electron beam hardenable leveling agent is an acrylate modified hydrocarbon surface active agent.

10. A photographic support comprising a base sheet, a hardened resin layer obtained from a composition comprising a white pigment and an electron beam hardened resin, said composition formed on one surface of the base sheet, and a hardened fluorescent-resin layer obtained from a composition comprising an electron beam hardened resin and a fluorescent agent, wherein the amount of said agent in said fluorescent resin layer is 0.01 to 1.00% by weight based on the weight of the electron beam resin, and said latter composition is formed on the hardened resin layer, hardening of the fluorescent-resin layer being conducted by irradiation of electron beams in an oxygen concentration of 660 ppm or less, and wherein the electron beam hardened resin-pigment layer has a film thickness of 5 to 100 $\mu m$.

11. A photographic support according to claim 10, wherein the hardened fluorescent-resin layer has a thickness of 5 $\mu m$ or less.

12. A photographic support according to claim 10, wherein an electron beam hardened leveling agent is contained in at least one of the hardened resin layer and the hardened fluorescent-resin layer.

13. A photographic support according to claim 10, wherein the fluorescent-resin layer further contains a photopolymerization initiator.

14. A photographic support according to claim 1-, which further comprises a hydrophilic coating layer on the hardened fluorescent-resin layer.

* * * * *